United States Patent [19]
Yokota

[11] Patent Number: 6,107,232
[45] Date of Patent: Aug. 22, 2000

[54] POLYMERIZATION CATALYST AND PROCESS FOR PREPARING POLYMER BY USE OF SAME

[75] Inventor: Kiyohiko Yokota, Sodegaura, Japan

[73] Assignee: Idemitsu Kosan Co., Ltd., Tokyo, Japan

[21] Appl. No.: 08/448,332

[22] PCT Filed: Dec. 16, 1993

[86] PCT No.: PCT/JP93/01826

§ 371 Date: Jun. 9, 1995

§ 102(e) Date: Jun. 9, 1995

[87] PCT Pub. No.: WO94/14859

PCT Pub. Date: Jul. 7, 1994

[30] Foreign Application Priority Data

Dec. 18, 1992 [JP] Japan ................................. 4-338243
Apr. 21, 1993 [JP] Japan ................................. 5-094449
Oct. 21, 1993 [JP] Japan ................................. 5-263934

[51] Int. Cl.[7] ......................................... C08F 4/64
[52] U.S. Cl. ..................... 502/155; 502/103; 502/162; 502/164; 526/126; 526/127; 526/132; 526/133; 526/134; 526/160; 526/161; 526/165; 526/172
[58] Field of Search ....................... 502/103, 155, 502/162, 164; 526/132, 133, 134, 160, 161, 165, 172, 126, 127

[56] References Cited

U.S. PATENT DOCUMENTS

| | | |
|---|---|---|
| 4,727,123 | 2/1988 | Weinert et al. .................... 526/161 |
| 5,021,595 | 6/1991 | Datta . |
| 5,318,935 | 6/1994 | Canich et al. ..................... 526/160 |
| 5,344,900 | 9/1994 | Maezawa et al. . |
| 5,369,196 | 11/1994 | Matsumoto et al. . |
| 5,374,696 | 12/1994 | Rosen et al. ...................... 526/160 |
| 5,380,810 | 1/1995 | Loi et al. ........................... 526/160 |
| 5,502,128 | 3/1996 | Flores et al. ...................... 526/160 |

FOREIGN PATENT DOCUMENTS

| | | |
|---|---|---|
| 0 495 375 | 7/1992 | European Pat. Off. . |
| 0 509 233 | 10/1992 | European Pat. Off. . |
| 0 532 098 | 3/1993 | European Pat. Off. . |
| WO 92/12162 | 7/1992 | WIPO . |

OTHER PUBLICATIONS

Chernega et al., J. Chem. Soc. Chem. Commmun. (Oct. 1993) 1415–17.
Gomez et al. Journal of Organometallic Chemistry, 491 (Mar. 1995) 153–158.

Primary Examiner—David W. Wu
Assistant Examiner—Ling Sui Choi
Attorney, Agent, or Firm—Oblon, Spivak, McClelland, Maier & Neustadt, P.C.

[57] ABSTRACT

The present invention is directed to a polymerization catalyst which comprises (A) a transition metal compound represented by the general formula (I)

$$L_d M X_e Y_f Z_g \tag{I}$$

[wherein the respective symbols are as defined in the specification], (B) a compound capable of forming an ionic complex from the transition metal compound of the component (A) or its derivative and, if necessary, (C) an organic aluminum compound; and a process for preparing homopolymerizing or copolymerizing monomers in the presence of the above-mentioned polymerization catalyst. The polymerization catalyst of the present invention has a high activity at 70 to 200° C. which is efficient in an industrial process or at a higher temperature and permits the formation of a (co)polymer which has a high molecular weight and a uniform composition and which can control a molecular weight distribution.

19 Claims, No Drawings

POLYMERIZATION CATALYST AND PROCESS FOR PREPARING POLYMER BY USE OF SAME

TECHNICAL FIELD

The present invention relates to a novel polymerization catalyst and a process for preparing a polymer by the use of the catalyst. More specifically, the present invention relates to a polymerization catalyst suitable for olefin polymerization, and a process for efficiently preparing a homopolymer or a copolymer of an olefin by the use of this catalyst.

BACKGROUND ART

Heretofore, combinations of transition metal compounds and aluminoxanes are known as highly active soluble catalysts for olefin polymerization (Japanese Patent Application Laid-open Nos. 19309/1983 and 217209/1985). Furthermore, it has been reported that ionic complexes are useful as active species of soluble catalysts for olefin polymerization [Journal of the American Chemical Society (J. Am. Chem. Soc.), Vol. 81, p. 81 (1959), Vol. 82, p. 1953 (1960), and Vol. 107, p. 7219 (1985)].

Moreover, examples in which these active species are isolated and applied to the olefin polymerization have been described in J. Am. Chem. Soc., Vol. 108, p. 7410 (1986), Japanese Patent Application Disclosure No. 502636/1989, Japanese Patent Application Laid-open No. 139504/1991 and EP Laid-open Patent No. 468651, and examples in which these active species are used together with organic aluminum compounds have been described in Japanese Patent Application Laid-open No. 207704/1991 and International Patent Laid-open No. 92-1723.

However, polymers produced by the use of complexes having cyclopentadienyl ligands which have been used in these conventional techniques have a problem that the molecular weight of the obtained polymer is low, in the case that the polymerization is carried out at a reaction temperature of 70 to 200° C. which is efficient in an industrial process, or at a higher temperature.

DISCLOSURE OF THE INVENTION

Under such circumstances, the present invention has been attained for the purpose of providing a polymerization catalyst which has a high activity at 70 to 200° C. which is efficient in an industrial process or at a higher temperature and which permits the formation of a polymer having a high molecular weight and a uniform composition, and a process for efficiently preparing a homopolymer or a copolymer of an olefin by the use of this polymerization catalyst.

The present inventors have intensively researched with the intention of achieving the above-mentioned object, and as a result, it has been found that this object can be achieved by a polymerization catalyst containing a specific transition metal compound, an activation cocatalyst, particularly an activation cocatalyst which is a compound capable of forming a cationic species from the transition metal compound or its derivative, and an organic aluminum compound which can be used in a certain case. The present invention has been completed on the basis of such a knowledge.

That is to say, the present invention provides a polymerization catalyst which comprises (A) a transition metal compound represented by the general formula (I)

$$L_d MX_e Y_f Z_g \qquad (I)$$

[wherein M represents a metal in the groups 3 to 10, a lanthanide series or an actinide series of the periodic table, L represents a formula

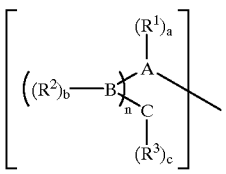

(wherein A, B and C each represents an element in the group 13, 14, 15 or 16 of the periodic table, at least one of A and C represents an element in the group 15, and A-B, B-B and B-C each is linked by a single bond, a double bond or a combination thereof; A is bonded to M, C is coordinated with M in the case that C has a lone pair, or C is bonded by resonance in the case that the resonance occurs among M, A, B and C; n represents an integer of 0 to 10, and $((R^2)_b\text{-B})$s may be the same or different; $R^1$, $R^2$ and $R^3$ each represents a hydrogen atom, a halogen atom, an organic metalloid group, an alkoxy group, an amino group, a hydrocarbon group or a hetero-atom-containing hydrocarbon group, they may be the same or different from each other, $R^1$, $R^2$ and $R^3$ may crosslink therebetween, and $R^1$, $R^2$, $R^3$ and M may crosslink therebetween; and a, b and c each is an integer of 0 to 3), d is an integer which is not less than 1 and not more than the valence of M, and Ls may be the same or different from each other and may crosslink therebetween; X represents a ligand having conjugated π electrons, e is 0 or 1, and the L group and the X group may crosslink therebetween; Y represents a σ-bond ligand or a chelate ligand, f is an integer of 0 or more and is equal to [(the valence of M)−(d+e)], and Ys may be the same or different from each other; Z represents a Lewis base, g is an integer of 0 to 4, and Zs may be the same or different from each other; and the L group, the X group and the Y group may crosslink therebetween], and (B) an activation cocatalyst.

Furthermore, the present invention provides a polymerization catalyst containing the above-mentioned components (A) and (B), and an organic aluminum compound (C).

In addition, the present invention provides a process for preparing a polymer which comprises the step of homopolymerizing an olefin or copolymerizing the olefin and another olefin and/or another polymerizable unsaturated compound in the presence of the above-mentioned polymerization catalyst.

Moreover, the polymerization catalyst of the present invention also covers a carrier on which at least component (A) or (B) of the above-mentioned components is supported.

BEST MODE FOR CARRYING OUT THE INVENTION

In a polymerization catalyst of the present invention, a transition metal compound represented by the general formula (I)

$$L_d MX_e Y_f Z_g \qquad (I)$$

is used as a component (A).

In the above-mentioned general formula (I), M is a metal in the groups 3 to 10, a lanthanide series or an actinide series of the periodic table. Furthermore, L represents a formula

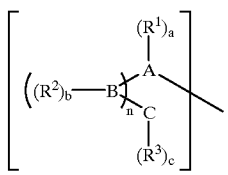

as described above.

Here, A, B and C each represents an element in the group 13, 14, 15 or 16 of the periodic table, at least one of A and C represents an element in the group 15, and A-B, B-B and B-C each is linked by a single bond, a double bond or a combination thereof. A is bonded to M, C is coordinated with M in the case that C has a lone pair, or C is bonded by resonance in the case that the resonance occurs among M, A, B and C. n represents an integer of 0 to 10, and $((R^2)_b$-B)s may be the same or different. $R^1$, $R^2$ and $R^3$ each represents a hydrogen atom, a halogen atom, an organic metalloid group, an alkoxy group, an amino group, a hydrocarbon group or a hetero-atom-containing hydrocarbon group, they may be the same or different from each other, $R^1$, $R^2$ and $R^3$ may crosslink therebetween, and $R^1$, $R^2$, $R^3$ and M may crosslink therebetween. a, b and c each is an integer of 0 to 3. d represents an integer which is not less than 1 and not more than the valence of M, and Ls may be the same or different from each other and may crosslink therebetween. X represents a ligand having conjugated π electrons. A typical example of X is an allyl group, a cyclopentadienyl group, a substituted cyclopentadienyl group, or a cyclopentadienyl group or a substituted cyclopentadienyl group containing a hetero-atom in a cyclopentadienyl ring.

e represents 0 or 1, and the L group and the X group may crosslink therebetween. Y represents a σ-bond ligand or a chelate ligand, f is an integer of 0 or more and is equal to [(the valence of M)–(d+e)], and Ys may be the same or different from each other. Z represents a Lewis base, g represents an integer of 0 to 4, and Zs may be the same or different from each other. The L group, the X group and the Y group may crosslink therebetween. A typical example of this Y is a hydrogen atom, a halogen atom, an organic metalloid group, an alkoxy group, an amino group, a hydrocarbon group or a hetero-atom-containing hydrocarbon group.

Typical examples of the transition metal compound represented by the general formula (I) include bis[N,N'-bis (trimethylsilyl)benzamidinato]zirconium dichloride, bis(N, N'-dimethylacetamidinato]zirconium dichloride, bis[(t-butoxydimethylsilyl)-t-butylamino]zirconium dichloride, bis(t-butoxydimethylsiloxy)zirconium dichloride, bis[N,N'-bis(trimethylsilyl)benzamidinato]zirconium dihydride, bis (N,N'-dimethylacetamidinato]zirconium dihydride, bis[(t-butoxydimethylsilyl)-t-butylamino]zirconium dihydride, bis (t-butoxydimethylsiloxy)zirconium dihydride, bis[N,N'-bis (trimethylsilyl)benzamidinato]bis(trimethylsilyl)zirconium, bis(N,N'-dimethylacetamidinato bis(trimethylsilyl) zirconium, bis[(t-butoxydimethylsilyl)-t-butylamino]bis (trimethylsilyl)zirconium, bis(t-butoxydimethylsiloxy)bis (trimethylsilyl)zirconium, bis[N,N'-bis(trimethylsilyl) benzamidinato]diethoxyzirconium, bis(N,N'-dimethylacetamidinato)diethoxy zirconium, bis[(t-butoxydimethylsilyl)-t-butylamino]diethoxyzirconium, bis (t-butoxydimethylsiloxy)diethoxyzirconium, bis[N,N'-bis (trimethylsilyl)benzamidinato]bis(diethylamino)zirconium, bis(N,N'-dimethylacetamidinato)bis(diethylamino) zirconium, bis[(t-butoxydimethylsilyl)-t-butylamino]bis (diethylamino)zirconium, bis(t-butoxydimethylsiloxy)bis (diethylamino)zirconium, bis[N,N'-bis(trimethylsilyl) benzamidinato]bis(trimethylsilylmethyl)zirconium, bis(N, N'-dimethylacetamidinato)bis(trimethylsilylmethyl) zirconium, bis[(t-butoxydimethylsilyl)-t-butylamino]bis (trimethylsilylmethyl)zirconium, bis(t-butoxydimethylsiloky)bis(trimethylsilylmethyl)zirconium; bis[N,N'-bis(trimethylsilyl)benzamidinato] dimethylzirconium, bis(N,N'-dimethylacetamidinato) dimethylzirconium, bis[(t-butoxydimethylsilyl)-t-butylamino]dimethylzirconium, bis(t-butoxydimethylsiloxy)dimethylzirconium, [N,N'-bis (trimethylsilyl)benzamidinato]zirconium trichloride, (N,N'-dimethylacetamidinato)zirconium trichloride, [(t-butoxydimethylsilyl)-t-butylamino]zirconium trichloride, (t-butoxydimethylsiloxy)zirconium trichioride, cyclopentadienyl[N,N'-bis(trimethylsilyl)benzamidinato] zirconium dichloride, cyclopentadienyl(N,N'-dimethylacetamidinato)zirconium dichloride, cyclopentadienyl[(t-butoxydimethylsilyl)-t-butylamino] zirconium dichloride, cyclopentadienyl(t-butoxydimethylsiloxy)zirconium dichloride, cyclopentadienylbis[N,N'-bis(trimethylsilyl)benzamidinato] zirconium chloride, cyclopentadiethylbis(N,N'-dimethylacetamidinato)zirconium chloride, cyclopentadienylbis[(t-butoxydimethylsilyl)-t-butylamino] zirconium chloride, cyclopentadienylbis(t-butoxydimethylsiloxy)zirconium chloride, butylenebis[N, N'-bis(trimethylsilyl)amidinato]zirconium dichloride, δ-cyclopentadienylvaler-N,N'-bis(trimethylsilyl) amidinatozirconium dichloride, δ-(t-butylamino)valer-N,N'-bis(trimethylsilyl)amidinatozirconium dichloride and these compounds in which zirconium is replaced with titanium and hafnium. Needless to say, they are not restrictive. Similar compounds of metals in other groups, a lanthanide series and an actinide series are also used as the transition metal compounds.

These transition metal compounds may be used singly or in a combination of two or more thereof.

In the polymerization catalyst of the present invention, an activation cocatalyst is used as a component (B). As one of the activation cocatalysts, there can be used a compound capable of forming an ionic complex from the transition metal compound which is the component (A) or its derivative. Examples of this compound capable of forming the ionic complex from the transition metal compound which is the component (A) or its derivative include (B-1) an ionic compound capable of reacting with the transition metal compound which is the component (A) to form the ionic complex, (B-2) an aluminoxane, and (B-3) a Lewis acid.

As the component (B-1), any compound can be used, so long as it is the ionic compound capable of reacting with the transition metal compound which is the component (A) to form the ionic complex, but compounds represented by the general formulae (II) and (III) can suitably be used:

 (II)

 (III)

[wherein $L^2$ is $M^2$, $R^5R^6M^3$, $R^7{}_3C$ or $R^8M^3$] [in the formulae (II) and (III), $L^1$ is a Lewis base, $[Z]^-$ is a non-coordinating anion $[Z^1]^-$ or $[Z^2]^-$, and here $[Z^1]^-$ is an anion in which a plurality of groups are bonded to an element, i.e., $[M^1A^1A^2 \ldots A^n]^-$ (wherein $M^1$ represents an element in the groups 5 to 15 of the periodic table, preferably an element in the groups 13 to 15 of the periodic table. $A^1$–$A^n$ each represents a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a hetero-atom-containing hydrocarbon group having 2 to 20 carbon atoms. Two or more of $A^1$–$A^n$ may form a ring. n is an integer of [(a valence of the central metal $M^1$)+1]), and $[Z^2]^-$ represents a conjugate base of a Brønsted acid alone or a combination of a Brønsted acid and Lewis acid in which pKa is −10 or less, or a conjugate base of the acid which is usually defined as an ultra-strong acid. The group $[Z^2]^-$ may be coordinated by a Lewis base. Furthermore, $R^4$ represents a hydrogen atom, an alkyl group having 1 to 20 carbon atoms, or an aryl group, an alkylaryl group or an arylalkyl group having 6 to 20 carbon atoms, and $R^5$ and $R^6$ each represents a cyclopentadienyl group, a substituted cyclopentadienyl group, an indenyl group or a fluorenyl group, and $R^7$ represents an alkyl group, an aryl group, an alkylaryl group or an arylalkyl group having 1 to 20 carbon atoms. $R^8$ represents a large cyclic ligand such as tetraphenylporphyrin or phthalocyanine. k is an ion valence of $[L^1-R^9]$ or $[L^2]$ and it is an integer of 1 to 3, and p is an integer of 1 or more, and q=(k×p). $M^2$ contains an element in the groups 1 to 3, 11 to 13 and 17 of the periodic table, and $M^3$ represents an element in the groups 7 to 12].

Here, typical examples of $L^1$ include ammonia, amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline, phosphines such as triethylphosphine, triphenylphosphine and diphenylphosphine, a thioether such as tetrahydrothiophene, an ester such as ethyl benzoate, and nitriles such as acetonitrile and benzonitrile.

Typical examples of $R^4$ include hydrogen, a methyl group, an ethyl group, a benzyl group and a trityl group, and typical examples of $R^5$ and $R^6$ include a cyclopentadienyl group, a methylcyclopentadienyl group, an ethylcyclopentadienyl group and a pentamethylcyclopentadienyl group. Typical examples of $R^7$ include a phenyl group, a p-tolyl group and a p-methoxyphenyl group, and typical examples of $R^8$ include a tetraphenylporphine, phthalocyanine, allyl and methallyl. Moreover, typical examples of $M^2$ include Li, Na, K, Ag, Cu, Br, I and $I_3$, and typical examples of $M^3$ include Mn, Fe, Co, Ni and Zn.

Furthermore, in $[Z^1]^-$, i.e., $[M^1A^1A^2 \ldots A^n]^-$, typical examples of $M^1$ include B, Al, Si, P, As and Sb, and B and Al are preferable. Moreover, typical examples of $A^1$, $A^2$–$A^n$ include a dimethylamino group and a diethylamino group as the dialkylamino group; a methoxy group, an ethoxy group, a n-butoxy group and a phenoxy group as the alkoxy group or the aryloxy group; a methyl group, an ethyl group, a n-propyl group, an isopropyl group, a n-butyl group, an isobutyl group, a n-octyl group, a n-eicosyl group, a phenyl group, a p-tolyl, a benzyl group, a 4-t-butylphenyl group and a 3,5-dimethylphenyl group as the hydrocarbon group; fluorine, chlorine, bromine and iodine as the halogen atoms; a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group and a bis(trimethylsilyl)methyl group as the hetero-atom-containing hydrocarbon group; and a pentamethylantimony group, a trimethylsilyl group, a trimethylgermil group, a diphenylarsine group and a dicyclohexylantimony group as the organic metalloid group.

Furthermore, typical examples of the non-coordinating anion, i.e., the conjugate base $[Z^2]^-$ of the Brønsted acid alone or the combination of the Brønsted acid and the Lewis acid in which pKa is −10 or less include a trifluoromethanesulfonic acid anion $(CF_3SO_3)^-$, a bis(trifluoromethanesulfonyl)methyl anion, a bis(trifluoromethanesulfonyl)benzyl anion, a bis(trifluoromethanesulfonyl)amide, a perchloric acid anion $(ClO_4)^-$, a trifluoroacetic acid anion $(CF_3CO_2)^-$, a hexafluoroantimony anion $(SbF_6)^-$, a fluorosulfonic acid anion $(FSO_3)^-$, a chlorosulfonic acid anion $(ClSO_3)^-$, a fluorosulfonic acid anion-5-antimony fluoride $(FSO_3—SbF_5)^-$, a fluorosulfonic acid anion-5-arsenic fluoride $(FSO_3—AsF_5)^-$ and a trifluoromethanesulfonic acid anion-5-antimony fluoride $(CF_3SO_3—SbF_5)^-$.

Typical examples of the ionic compound capable of reacting with the transition metal compound of the above-mentioned component (A) to form an ionic complex, i.e., the (B-1) component compound include triethylammonium tetraphenylborate, tri-n-butylammonium tetraphenylborate, trimethylammonium tetraphenylborate, tetraethylammonium tetraphenylborate, methyl (tri-n-butyl) ammonium tetraphenylborate, benzyl(tri-n-butyl)ammonium tetraphenylborate, dimethyldiphenylammonium tetraphenylborate, triphenyl(methyl) ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis (pentafluorophenyl)borate, tri-n-butylammonium tetrakis (pentafluorophenyl)borate, triphenylammonium tetrakis (pentafluorophenyl)borate, tetra-n-butylammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl) borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl) borate, triphenylphosphonium tetrakis(pentafluorophenyl) borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl) borate, (1,1'-dimethylferrocenium) tetrakis (pentafluorophenyl)borate, decamethylferrocenium tetrakis (pentafluorophenyl)borate, silver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenylporphyrin-manganese tetrakis(pentafluorophenyl)borate, silver tetrafluoroborate, silver hexafluorophosphate, silver hexafluoroarsenate, silver perchlorinate, silver trifluoroacetate and silver trifluoromethanesulfonate.

The ionic compounds, which are this ( B-1) components, capable of reacting with the transition metal compound of the above-mentioned component (A) to form an ionic complex may be used singly or in a combination of two or more thereof.

Next, as the aluminoxane of the (B-2) component, there can be mentioned a chain aluminoxane represented by the general formula (IV)

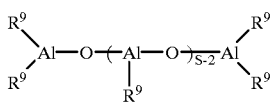

(IV)

(wherein $R^9$s each represents a halogen atom, or an alkyl group, an alkenyl group, an aryl group or an arylalkyl group having 1 to 20 carbon atoms, preferably 1 to 12 carbon atoms, the respective $R^9$s may be the same or different, s represents a polymerization degree, and it is an integer of usually 3 to 50, preferably 7 to 40) and a cyclic aluminoxane represented by the general formula (V)

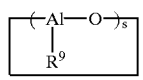

(V)

(wherein $R^9$s and s are as defined above).

As a preparation method of the above-mentioned aluminoxanes, a method can be mentioned in which an alkylaluminum is brought into contact with a condensation agent such as water, but no particular restriction is put on its means, and the reaction can be carried out in a known manner. For example, there are (1) a method which comprises dissolving an organic aluminum compound in an organic solvent, and then bringing the solution into contact with water, (2) a method which comprises first adding an organic aluminum compound at the time of polymerization, and then adding water, (3) a method which comprises reacting water of crystallization contained in a metallic salt or water adsorbed by an inorganic substance or an organic substance with an organic aluminum compound, and (4) a method which comprises reacting a tetraalkyldialuminoxane with a trialkylaluminum, and further reacting with water. In this connection, the aluminoxane may be that which is insoluble in toluene.

These aluminoxanes may be used singly or in a combination of two or more thereof.

Furthermore, no particular restriction is put on the Lewis acid which is the (B-3) component, and this Lewis acid may be an organic compound or a solid inorganic compound. As the organic compound, boron compounds and aluminum compounds are preferably used, and as the inorganic compound, magnesium compounds and aluminum compounds are preferably used. Examples of the aluminum compounds include bis(2,6-di-t-butyl-4-methylphenoxy) aluminum methyl and (1,1-bi-2-naphthoxy)aluminum methyl, examples of the magnesium compounds include magnesium chloride and diethoxymagnesium, examples of the aluminum compounds include aluminum oxide and aluminum chloride, and examples of the boron compounds include triphenylboron, tris(pentafluorophenyl)boron, tris[3,5-bis(trifluoromethyl)phenyl]boron, tris[(4-fluoromethyl)phenyl]boron, trimethylboron, triethylboron, tri-n-butylboron, tris(fluoromethyl)boron, tris(pentafluoroethyl)boron, tris(nonafluorobutyl)boron, tris(2,4,6-trifluorophenyl)boron, tris(3,5-difluoro)boron, tris[3,5-bis(trifluoromethyl)phenyl]boron, bis(pentafluorophenyl) fluoroboron, diphenylfluoroboron, bis(pentafluorophenyl)chloroboron, dimethylfluoroboron, diethylfluoroboron, di-n-butylfluoroboron, pentafluorophenyldifluoroboron, phenyldifluoroboron, pentafluorophenyldichloroboron, methyldifluoroboron, ethyldifluoroboron and n-butyldifluoroboron.

These Lewis acids may be used singly or in a combination of two or more thereof.

The use ratio of the catalyst component (A) to the catalyst component (B) in the polymerization catalyst of the present invention is preferably in the range of 10:1 to 1:100, more preferably 2:1 to 1:10 in terms of a molar ratio in the case that the compound (B-1) is used as the catalyst component (B), and it is preferably in the range of 1:1 to 1:1000000, more preferably 1:10 to 1:10000 in terms of a molar ratio in the case that the compound (B-2) is used.

The use ratio of the catalyst component (A) to the catalyst component (B-3) is preferably in the range of 1:0.1 to 1:2000, more preferably 1:0.2 to 1:1000, most preferably 1:0.5 to 1:500 in terms of a molar ratio. Moreover, as the catalyst component (B), (B-1), (B-2) and (B-3) can be used singly or a combination of two or more thereof.

The polymerization catalyst of the present invention may contain the above-mentioned component (A) and component (B) as the main components, or it may contain the component (A), the component (B) and the organic aluminum compound (C) as the main components.

Here, as the organic aluminum compound which is the component (C), there can be used a compound represented by the general formula (VI)

$$R^{10}{}_r AlQ_{3-r} \qquad (VI)$$

(wherein $R^{10}$ represents an alkyl group having 1 to 10 carbon atoms, Q is a hydrogen atom, an alkoxy group having 1 to 20 carbon atoms, an aryl group having 6 to 20 carbon atoms or a halogen atom, and r is an integer of 1 to 3).

Typical examples of the compound represented by the general formula (VI) include trimethylaluminum, triethylaluminum triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

These organic aluminum compounds may be used singly or in a combination of two or more thereof.

The use ratio of the catalyst component (A) to the catalyst component (C) is preferably in the range of 1:1 to 1:1000, more preferably 1:5 to 1:2000, most preferably 1:10 to 1:1000 in terms of a molar ratio. By the use of the catalyst component (C), polymerization activity per transition metal can be improved, but if its amount is too large, the organic aluminum compound is wasteful and it remains in large quantitie s in a polymer unpreferably.

In the present invention, at least one of the catalyst components can be supported on a suitable carrier and then used. No particular restriction is put on the kind of carrier, and inorganic oxide carriers, other inorganic carriers and organic carriers all can be used, but the inorganic oxide carriers and the other inorganic carriers are particularly preferable.

Typical examples of the inorganic oxide carriers include $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica-alumina, zeolite, ferrite, sepiolite and glass fiber. Above all, $SiO_2$ and $Al_2O_3$ are particularly preferable. In this connection, the above-mentioned inorganic oxide carrier may contain a small amount of a carbonate, a nitrate, a sulfate or the like.

On the other hand, examples of the carriers other than mentioned above include magnesium compounds and their complex salts represented by the general formula $MgR^{11}_x X^1_y$ which are typified by magnesium compounds such as $MgCl_2$ and $Mg(OC_2H_5)_2$. Here, $R^{11}$ represents an alkyl group having 1 to 20 carbon atoms, an alkoxy group having 1 to 20 carbon atoms or an aryl group having 6 to 20 carbon atoms, $X^1$ is a halogen atom or an alkyl group having 1 to 20 carbon atoms, x is from 0 to 2, y is from 0 to 2, and x+y=2. The respective $R^{11}$s and $X^1$s may be the same or different.

Furthermore, examples of the organic carriers include polymers such as polystyrene, substituted polystyrenes, styrene-divinylbenzene copolymer, polyethylene, polypropylene and polyarylate, starch and carbon.

As the carriers which can be used in the present invention, preferable are $MgCl_2$, $MgCl(OC_2H_5)$, $Mg(OC_2H_5)_2$, $SiO_2$, $Al_2O_3$ and the like. The state of the carrier depends upon its kind and a manufacturing process, but its average particle diameter is usually in the range of 1 to 300 µm, preferably 10 to 200 µm, more preferably 20 to 100 µm.

If the particle diameter is small, the fine powder of the polymer increases, and if the particle diameter is large, the coarse particles of the polymer increase, which causes the deterioration of a bulk density and the clogging of a hopper.

Moreover, the specific surface area of the carrier is usually in the range of 1 to 1000 $m^2/g$, preferably 50 to 500 $m^2/g$, and its pore volume is usually in the range of 0.1 to 5 $cm^3/g$, preferably 0.3 to 3 $cm^3/g$.

If either of the specific surface area and the pore volume deviates from the above-mentioned range, catalyst activity deteriorates sometimes. In this connection, the specific surface area and the pore volume can be calculated from the volume of an adsorbed nitrogen gas in accordance with a BET method [refer to Journal of the American Chemical society, Vol. 60, p. 309 (1983)].

Furthermore, it is desirable that the above-mentioned carrier, when used, is calcined usually at 150 to 1000° C., preferably 200 to 800° C.

In the case that at least one of the catalyst components is supported on the above-mentioned carrier, it is desirable that at least one of the catalyst component (A) and the catalyst component (B), preferably both of the catalyst component (A) and the catalyst component (B) are supported.

No particular restriction is put on a method for supporting at least one of the component (A) and the component (B), but there can be employed, for example, (1) a method of mixing at least one of the component (A) and the component (B) with the carrier, (2) a method of mixing, in an inert solvent, at least one of the component (A) and the component (B) with the carrier, after the carrier has been treated with an organic aluminum compound or a halogen-containing silicon compound, (3) a method of reacting the carrier, the component (A) and/or the component (B) with the organic aluminum compound or the halogen-containing silicon compound, (4) a method of mixing the component (B) or the component (A) with the carrier, after the component (A) or the component (B) has been supported on the carrier, (5) a method of mixing the carrier with a catalytic reaction product of the component (A) and the component (B), and (6) a method in which the carrier is allowed to coexist in the catalytic reaction of the component (A) with the component (B).

Incidentally, in the reactions of the above-mentioned methods (4), (5) and (6), the organic aluminum compound of the component (C) can be added.

The thus obtained catalyst may be taken out as a solid by once distilling off the solvent and then used for the polymerization, or may be used for the polymerization as it is.

Moreover, in the present invention, the catalyst can be formed by carrying out the operation of supporting at least one of the component (A) and the component (B) on the carrier in a polymerization system. For example, a process can be employed which comprises adding at lease one of the component (A) and the component (B), the carrier and, if necessary, the organic aluminum compound of the above-mentioned component (C), further adding an olefin such as ethylene under atmospheric pressure to 20 $kg/cm^2$, and then doing prepolymerization at -20 to 200° C. for a period of 1 minute to 2 hours to produce catalyst particles.

In the present invention, the use ratio of the above-mentioned compound (B-1) to the carrier is preferably in the range of 1:5 to 1:10000, more preferably 1:10 to 1:500, and the use ratio of the compound (B-2) to the carrier is preferably in the range of 1:0.5 to 1:1000, more preferably 1:1 to 1:50 in terms of a weight ratio. Furthermore, it is desirable that the use ratio of the compound (B-3) to the carrier is preferably in the range of 1:5 to 1:10000, more preferably 1:10 to 1:500 in terms of a weight ratio. In the case that two or more kinds of catalyst components (B) are mixed and used, it is desirable that the use ratio of the respective components (B) to the carrier is within the above-mentioned range. In addition, it is desirable that the use ratio of the component (A) to the carrier is preferably in the range of 1:5 to 1:10000, more preferably 1:10 to 1:500 in terms of a weight ratio.

If the use ratio of the component (B) [the component (B-1), the component (B-2) or the component (B-3)] to the carrier, or the use ratio of the component (A) to the carrier deviates from the above-mentioned range, the activity deteriorates sometimes. The average particle diameter of the thus prepared polymerization catalyst of the present invention is usually in the range of 2 to 200 µm, preferably 10 to 150 µm, particularly preferably 20 to 100 µm, and the specific surface area of the catalyst is usually in the range of 20 to 1000 $m^2/g$, preferably 50 to 500 $m^2/g$. If the average particle diameter is less than 2 µm, the amount of the fine powder in the polymer increases sometimes, and if it is more than 200 µm, the coarse particles in the polymer increase sometimes. If the specific surface area is less than 20 $m^2/g$, the activity deteriorates sometimes, and if it is in excess of 1000 $m^2/g$, the bulk density of the polymer deteriorates sometimes. Furthermore, in the catalyst of the present invention, the amount of the transition metal in 100 g of the carrier is usually in the range of 0.05 to 10 g, particularly preferably 0.1 to 2 g. If the amount of the transition metal is outside the above-mentioned range, the activity deteriorates sometimes.

By supporting the component on the carrier, there can be obtained the polymer having a high bulk density and an excellent particle diameter distribution which are industrially advantageous.

According the process for preparing the polymer of the present invention, for example, the homopolymerization of an olefin, a copolymerization of different kinds of olefins such as ethylene and another olefin, and the copolymerization of one or more kinds of olefins and another polymerizable unsaturated compound can suitably be carried out by the use of the above-mentioned polymerization catalyst.

No particular restriction is put on the kind of olefin, but α-olefins having 2 to 20 carbon atoms are preferable. Concretely, there can be used ethylene, propylene, 1-butene, 3-methyl-1-butene, 1-pentene, 4-methyl-1-pentene, 1-hexene, 1-octene, 1-decene, 1-dodecene, 1-tetradecene, 1-hexadecene, 1-octadecene, 1-eicosene, styrene, p-methylstyrene, p-chlorostyrene, p-t-butylstyrene, p-phenylstyrene, p-methylsilylstyrene, p-trimethylsilylstyrene and the like.

In the present invention, the copolymerization of two or more kinds of olefins can be carried out as described above, but in the case of the copolymerization of propylene and ethylene, or the copolymerization of ethylene and an α-olefin having 3 to 10 carbon atoms, a copolymerization ratio is usually selected in the range of 99.9:0.1 to 0.1 to 99.9, preferably 99.5:0.5 to 75.0:25.0 in terms of a molar ratio.

Incidentally, the preparation process of the polymer regarding the present invention is particularly suitable for the polymerization of the olefins, but as described above, this process can also be applied to the copolymerization of other polymerizable unsaturated compounds. Examples of the other polymerizable unsaturated compounds include chain diolefins such as butadiene, isoprene and 1,5-hexadiene, cyclic olefins such as norbornene and 1,4,5,8-dimethano-1,2,3,4,4a,5,8,8a-octahydronaphthalene, cyclic diolefins such as norbornadiene, 5-ethylidenenorbornene, 5-vinylnorbornene and dicyclopentadiene, unsaturated esters such as ethyl acrylate and methyl methacrylate, lactones such as β-propiolactone, β-butyrolactone and γ-butyrolactone, lactams such as ε-caprolactam and δ-valerolactam, and epoxides such as epoxypropane and 1,2-epoxybutane.

In the present invention, no particular restriction is put on a polymerization method, and there can be used any method of a slurry polymerization method, a gaseous phase polymerization method, a bulk polymerization method, a solution polymerization method and a suspension polymerization method, but the slurry polymerization method and the gaseous phase polymerization method are particularly preferable.

With regard to polymerization conditions, a polymerization temperature is in the range of –100 to 250° C., preferably –50 to 200° C., more preferably 0 to 130° C. Furthermore, with regard to the use ratio of the catalyst to the reaction material, the material monomer/the component (A) (molar ratio) is preferably in the range of 1 to $10^8$, particularly preferably 100 to $10^5$. Moreover, a polymerization time is usually in the range of 5 minutes to 10 hours, and a reaction pressure is preferably in the range of from atmospheric pressure to 200 kg/cm$^2$ G, more preferably from atmospheric pressure to 100 kg/cm$^2$ G.

The adjustment of the molecular weight of the polymer can be accomplished by selecting the kind and amount of catalyst component and the polymerization temperature, and using hydrogen at the polymerization.

In the case that a polymerization solvent is used, examples of the solvent include aromatic hydrocarbons such as benzene, toluene, xylene and ethylbenzene, alicyclic hydrocarbons such as cyclopentane, cyclohexane and methylcyclohexane, aliphatic hydrocarbons such as pentane, hexane, heptane and octane, and halogenated hydrocarbons such as chloroform and dichloromethane. These solvents may be used singly or in a combination of two or more thereof. Furthermore, a monomer such as the α-olefin may be used as the solvent. Incidentally, the polymerization can be carried out without using any solvent, depending upon the polymerization method.

No particular restriction is put on the molecular weight of the thus obtained polymer, but the intrinsic viscosity [η] (measured in decalin at 135° C.) of the polymer is preferably 0.1 dl/g or more, particularly preferably 0.2 dl/g or more.

In the present invention, prepolymerization can be carried out by the use of the above-mentioned polymerization catalyst. The prepolymerization can be performed by bringing, for example, a small amount of the olefin into contact with the solid catalyst component, but this prepolymerization process is not particularly restrictive, and a known process can be used. No particular restriction is put on the olefin for use in the prepolymerization, and the same olefins as exemplified above, for example, ethylene, α-olefins having 3 to 20 carbon atoms and mixtures thereof can be used. In the prepolymerization, it is advantageous to employ the same olefin as used in the polymerization.

Moreover, a prepolymerization temperature is usually in the range of –20 to 200° C., preferably –10 to 130° C., more preferably 0 to 80° C. In the prepolymerization, an inert hydrocarbon, an aliphatic hydrocarbon, an aromatic hydrocarbon and a monomer can be used as a solvent. Above all, the aliphatic hydrocarbon is particularly preferable. In addition, the prepolymerization may be carried out without using any solvent.

In the prepolymerization, it is desirable that conditions are set so that the intrinsic viscosity [η] (measured in decalin at 135° C.) of a prepolymerization product may be 0.2 dl/g or more, particularly 0.5 dl/g or more and so that the amount of the prepolymerization product per mmol of the transition metal component in the catalyst may be in the range of 1 to 10,000 g, particularly 10 to 1,000 g.

Next, the present invention will be described in more detail in accordance with examples and comparative examples, but the scope of the present invention should not be limited to these examples at all.

EXAMPLE 1

(1) Catalyst component (A): Synthesis of bis[N,N'-bis(trimethylsilyl)benzamidinato]zirconium dichloride (i) Synthesis of lithium-N,N'-bis(trimethylsilyl)benzamidinato Under a nitrogen atmosphere, 9.93 g (94.4 mmols) of bis(trimethylsilyl)amine dried and purged with nitrogen and 100 ml of hexane dried and purged with nitrogen were placed in a 300-ml Schlenk flask sufficiently purged with nitrogen, and the resultant solution was then cooled on a dry ice-ethanol bath. Next, 57.5 ml of a 1.64 mol/l n-butyllithium (94.4 mmols) solution in hexane was added dropwise to this solution, followed by stirring at room temperature for 12 hours. The solvent was distilled off under reduced pressure to obtain lithiumbis(trimethylsilyl)amide in the state of a white solid.

Afterward, 3.35 g (20.0 mmols) of this solid was placed in a 300-ml Schlenk flask sufficiently purged with nitrogen, and 100 ml of toluene was then added thereto to obtain a toluene solution. Next, under a nitrogen atmosphere, 2.04 ml (20.0 mmols) of benzonitrile dried and purged with nitrogen and 100 ml of toluene dried and purged with nitrogen were placed in a 300-ml Schlenk flask sufficiently purged with nitrogen, and the solution was then cooled on the dry ice-ethanol bath. A toluene solution of lithium bis(trimethylsilyl)amide was added to this solution, followed by stirring at room temperature for 24 hours. The solvent was distilled off under reduced pressure, and the resultant residue was then extracted with 150 ml of hexane. The solution was concentrated under reduced pressure to about 50 ml, and then cooled to –20° C. to obtain the desired compound in the state of colorless crystals.

(ii) Synthesis of bis[N,N'-bis(trimethylsilyl)benzamidinato]zirconium dichloride Under a nitrogen atmosphere, 1.15 g (9.81 mmols) of zirconium tetrachloride was placed in a 300-ml Schlenk flask sufficiently purged with nitrogen, and 100 ml of toluene dried and purged with nitrogen was then added thereto to obtain a suspension, followed by cooling on a dry ice-ethanol bath. Next, under the nitrogen atmosphere, 2.67 g (9.81 mmols) of lithium-N,N'-bis(trimethylsilyl)benzamidinato was placed in another 300-ml Schlenk flask sufficiently purged with nitrogen, and 100 ml of toluene dried and purged with nitrogen was then added thereto to obtain a toluene solution. Afterward, this solution was added to the previously prepared suspension, followed by stirring at room temperature for 48 hours. Next, the solvent was distilled off under reduced pressure, and the resultant residue was then extracted with 100 ml of toluene. The solution was concentrated to about 50 ml, and then cooled to −20° C. to obtain the desired compound in the state of colorless crystals.

The values of elemental analysis were as follows.

|  | C | H | N |
|---|---|---|---|
| Calcd. (%) | 45.3 | 6.7 | 8.1 |
| Found (%) | 45.3 | 6.9 | 8.1 |

(2) Preparation of catalyst (i) Under a nitrogen atmosphere, 0.0533 g (0.0774 mmol) of the catalyst component (A): bis[N,N'-bis(trimethylsilyl)benzamidinato]zirconium dichloride was placed in a 20-ml Schlenk flask sufficiently purged with nitrogen, and 8.7 ml of toluene dried and purged with nitrogen was added thereto to prepare a 0.010 mol/l bis[N,N'-bis(trimethylsilyl)benzamidinato]zirconium dichloride solution in toluene.

(ii) Under a nitrogen atmosphere, 0.0876 g (0.109 mmol) of a catalyst component (B): N,N'-dimethylanilinium tetrakis(pentafluorophenyl)borate was placed in a 20-ml Schlenk flask sufficiently purged with nitrogen, and 10.9 ml of toluene dried and purged with nitrogen was added thereto to prepare a 0.010 mol/l N,N'-dimethylanilinium tetrakis(pentafluorophenyl)borate solution in toluene.

(3) Polymerization

Under a nitrogen atmosphere, 400 ml of toluene dried and purged with nitrogen was introduced into a 1-liter autoclave equipped with a stirring blade and sufficiently purged with nitrogen, and 1.0 ml of a 1.0 mol/l triisobutylaluminum (1.0 mmol) solution in toluene was then added thereto under the nitrogen atmosphere. This solution was heated to 60° C., and 0.10 ml of the 0.010 mol/l bis[N,N'-bis(trimethylsilyl)benzamidinato]zirconium dichloride (1.0 micromol) solution in toluene prepared in the above-mentioned (2) was added thereto under the nitrogen atmosphere. Next, 0.10 ml of the 0.010 mol/l N,N'-dimethylanilinium tetrakis(pentafluorophenyl)borate (1.0 micromol) solution in toluene prepared in the above-mentioned (2) was added thereto under the nitrogen atmosphere. Afterward, the solution was heated to 80° C., and ethylene was then introduced thereinto with stirring and polymerization was carried out for 1 hour, while ethylene was continuously introduced so as to constantly maintain 8 atm. As a result, 4.0 g of polyethylene was obtained. According to measurement in decalin at 135° C., the intrinsic viscosity [η] of the obtained polyethylene was 2.9 dl/g.

EXAMPLE 2

Under a nitrogen atmosphere, 400 ml of toluene dried and purged with nitrogen was introduced into a 1-liter autoclave equipped with a stirring blade and sufficiently purged with nitrogen, and 2.78 ml of a 2.16 mols/l methylaluminoxan (6.0 mmols) solution in toluene was then added thereto under the nitrogen atmosphere. This solution was heated to 60° C., and 0.10 ml of the 0.010 mol/l bis[N,N'-bis(trimethylsilyl)benzamidinato]zirconium dichloride (1.0 micromol) solution in toluene prepared in the above-mentioned (2) was added thereto under the nitrogen atmosphere. Afterward, the solution was heated to 80° C., and ethylene was then introduced with stirring and polymerization was carried out for 1 hour, while ethylene was continuously introduced so as to constantly maintain 8 atm.

As a result, 9.3 g of polyethylene was obtained. According to measurement in decalin at 135° C., the intrinsic viscosity [η] of the obtained polyethylene was 13.2 dl/g.

EXAMPLE 3

Under a nitrogen atmosphere, 400 ml of toluene dried and purged with nitrogen was introduced into a 1-liter autoclave equipped with a stirring blade and sufficiently purged with nitrogen, and 63 ml of norbornene dried and purged with nitrogen and 0.60 ml of a 1.0 mol/l triisobutylaluminum (0.60 mmol) solution in toluene were further added thereto. This solution was heated to 120° C., and nitrogen pressure was maintained at 2 atm. Next, 20 ml of toluene dried and purged with nitrogen and 0.60 ml (0.60 mmol) of a toluene solution containing 1.0 mol of triisobutylealuminum were introduced under the nitrogen atmosphere into a catalyst introduction tube sufficiently purged with nitrogen and connected to the autoclave. In addition, 0.40 ml of a 0.010 mol/l bis[N,N'-bis(trimethylsilyl)benzamidinato]zirconium dichloride (4.0 micromols) solution in toluene prepared in Example 1 was added thereto, and 0.40 ml of the 0.010 mol/l N,N'-dimethylanilinium tetrakis(pentafluorophenyl)borate (4.0 micromols) solution in toluene prepared in the above-mentioned (2) was then added under the nitrogen atmosphere. This solution was poured into the above-mentioned 1-liter autoclave by ethylene pressure, while stirring was done in the autoclave, and polymerization was carried out in situ for 1 hour, while ethylene was continuously introduced so that the pressure in the autoclave might constantly be maintained at 8 atm.

As a result, 7.9 g of ethylene-norbornene copolymer was obtained. According to measurement in decalin at 135° C., the intrinsic viscosity [η] of the obtained copolymer was 1.4 dl/g.

COMPARATIVE EXAMPLE 1

Polymerization was carried out by the same procedure as in Example 3 except that in Example 3, bis[N,N'-bis(trimethylsilyl)benzamidinato]zirconium dichloride was replaced with biscyclopentadienylzirconium dichloride. As a result, 1.2 g of ethylene-norbornene copolymer was obtained. According to measurement in decalin at 135° C., the intrinsic viscosity [η] of the obtained copolymer was 1.0 dl/g.

EXAMPLE 4

Under a nitrogen atmosphere, 360 ml of toluene dried and purged with nitrogen and 40 ml of 1-octene dried and purged with nitrogen were introduced into a 1-liter autoclave equipped with a stirring blade and sufficiently purged with nitrogen, and 1.0 ml of a 1.0 mol/l triisobutylaluminum (1.0 mmol) solution in toluene was then added thereto under the nitrogen atmosphere. Afterward, this solution was heated to 60° C., and 0.10 ml of the 0.010 mol/l bis [N,N'-bis(trimethylsilyl)benzamidinato]zirconium dichloride (1.0 micromol) solution in toluene prepared in the above-mentioned (2) was added thereto under the nitrogen atmosphere. Next, 0.10 ml of the 0.010 mol/l N,N'-dimethylanilinium tetrakis(pentafluorophenyl)borate (1.0 micromol) solution in toluene prepared in the above-mentioned (2) was then added thereto under the nitrogen atmosphere. This solution was heated to 80° C., and ethylene was introduced with stirring and polymerization was carried out for 30 minutes, while ethylene was continuously introduced so as to constantly maintain 8 atm.

As a result, 15.7 g of ethylene-(1-octene) copolymer was obtained. According to measurement in decalin at 135° C., the intrinsic viscosity [η] of the obtained copolymer was 3.7 dl/g.

EXAMPLE 5

Under a nitrogen atmosphere, 360 ml of toluene dried and purged with nitrogen and 40 ml of 1-octene dried and purged with nitrogen were introduced into a 1-liter autoclave equipped with a stirring blade and sufficiently purged with nitrogen, and 2.78 ml of a 2.16 mols/l methylaluminoxane (6.0 mmols) solution in toluene was then added thereto under the nitrogen atmosphere. Afterward, this solution was heated to 60° C., and 0.10 ml of the 0.010 mol/l bis[N,N'-bis(trimethylsilyl)benzamidinato]zirconium dichloride (1.0 micromol) solution in toluene prepared in the above-mentioned (2) was added thereto under the nitrogen atmosphere. This solution was heated to 80° C., and ethylene was introduced with stirring and polymerization was carried out for 30 minutes, while ethylene was continuously introduced so as to constantly maintain 8 atm.

As a result, 3.5 g of ethylene-(1-octene) copolymer was obtained.

EXAMPLE 6

(1) Catalyst component (A)+catalyst component (B): Preparation of bis[N,N'-bis(trimethylsilyl)benzamidinato]zirconium ditriflate 0.138 g (0.20 mmol) of bis[N,N'-bis(trimethylsilyl)benzamidinato]zirconium dichloride was sampled, and this was then dissolved in 10 ml of toluene dried and purged with nitrogen to prepare a 0.020 mol/l solution A.

Next, 0.103 g (0.40 mmol) of silver trifluoromethanesulfonate was sampled, and this was then dissolved in 10 ml of toluene dried and purged with nitrogen to prepare a 0.040 mol/l solution B.

The solution B was added dropwise to the solution A at room temperature, while the solution A was stirred. The precipitate of the resultant silver chloride was removed by filtration to prepare a 0.010 mol/l solution of bis[N,N'-bis(trimethylsilyl)benzamidinato]zirconium ditriflate.

(2) Polymerization

Under a nitrogen atmosphere, 400 ml of toluene dried and purged with nitrogen was introduced into a 1-liter autoclave equipped with a stirring blade and sufficiently purged with nitrogen, and 1.0 ml of a 1.0 mol/l triisobutylaluminum (1.0 mmol) solution in toluene was then added thereto under the nitrogen atmosphere. This solution was heated to 60° C., and 0.10 ml of the 0.010 mol/l bis[N,N'-bis(trimethylsilyl)benzamidinato]zirconium ditriflate (1.0 micromol) solution in toluene prepared in the above-mentioned (1) was added thereto under the nitrogen atmosphere. Next, this solution was heated to 80° C., and ethylene was then introduced thereinto with stirring and polymerization was carried out for 1 hour, while ethylene was continuously introduced so as to constantly maintain 8 atm. As a result, 0.13 g of polyethylene was obtained. According to measurement in decalin at 135° C., the intrinsic viscosity [η] of the obtained polyethylene was 2.9 dl/g.

EXAMPLE 7

The same procedure as in Example 1 was carried out except that bis[N,N'-bis(trimethylsilyl)benzamidinato]zirconium dichloride was replaced with bis[N,N'-bis(trimethylsilyl)benzamidinato]zirconium ditriflate.

As a result, 7.4 g of polyethylene was obtained. According to measurement in decalin at 135° C., the intrinsic viscosity [η] of the obtained polyethylene was 6.3 dl/g, and the melting point of the polyethylene was 137.3° C. With regard to the measured results of molecular weight by gel permeation chromatography (GPC), a weight-average molecular weight (Mw) was 466,000, a number-average molecular weight (Mn) was 31,7000, and a molecular weight distribution (Mw/Mn) was 14.7.

The measurement conditions of the GPC were as follows.
Device: ALC/GPS 150C, made by Waters Co., Ltd.
Column: Toso Akzo Co., Ltd., TSK HM+GMH6×2
Solvent: 1,2,4-trichlorobenzene
Temperature: 135° C.

The measurement conditions of the melting point (Tm) were as follows.
DSC, temperature rise rate=10° C./min

EXAMPLE 8

The same procedure as in Example 4 was carried out except that bis[N,N'-bis(trimethylsilyl)benzamidinato]zirconium dichloride was replaced with bis[N,N'-bis(trimethylsilyl)benzamidinato]zirconium ditriflate.

As a result, 6.2 g of ethylene-(1-octene) copolymer was obtained. According to measurement in decalin at 135° C., the intrinsic viscosity [η] of the obtained copolymer was 5.4 dl/g, and the melting point of the copolymer was 124.7° C. With regard to the measured results of molecular weight by GPC, Mw was 304,000 and Mw/Mn was 24.8. Furthermore, an octene content was measured by a nuclear magnetic resonance method ($^{13}$C-NMR) of a carbon isotope, and as a result, it was 1.6 mol %.

EXAMPLE 9

Under a nitrogen atmosphere, 400 ml of toluene dried and purged with nitrogen was introduced into a 1-liter autoclave equipped with a stirring blade and sufficiently purged with nitrogen, and 1.0 ml of a 1.0 mol/l of triisobutylaluminum (1.0 mmol) solution in toluene was then added thereto under the nitrogen atmosphere. This solution was heated to 60° C., and 0.50 ml of a 0.010 mol/l bis[N,N'-bis(trimethylsilyl)benzamidinato]zirconium ditriflate (5.0 micromols) solution in toluene was added thereto under the nitrogen atmosphere. Next, 0.50 ml of a 0.010 mol/l N,N'-dimethylanilinium tetrakis(pentafluorophenyl)borate (5.0 micromols) solution in toluene was added thereto. Afterward, the solution was heated to 80° C., and propylene was then introduced thereinto with stirring and polymerization was carried out for 1 hour, while propylene was continuously introduced so as to constantly maintain 8 atm.

As a result, 4.9 g of polypropylene was obtained.

EXAMPLE 10

(1) Catalyst component (A): Preparation of (cyclopentadienyl)[N,N'-bis(trimethylsilyl)benzamidinato]titanium dichloride Under a nitrogen atmosphere, 2.27 g (10.35 mmols) of cyclopentadienyltitanium trichloride was placed in a 300-ml Schlenk flask sufficiently purged with nitrogen, and 50 ml of toluene dried and purged with nitrogen was added thereto to obtain a suspension, followed by cooling on a dry ice-ethanol bath. Next, under the nitrogen atmosphere, 2.80 g (10.35 mmols) of lithium-N,N'-bis(trimethylsilyl)benzamidinato was placed in another 300-ml Schlenk flask sufficiently purged with nitrogen, and 50 ml of toluene dried and purged with nitrogen was then added thereto to obtain a toluene solution. This solution was added to the previously prepared suspension, followed by stirring at room temperature for 12 hours. Next, the solvent was distilled off under reduced pressure, and the resultant residue was then extracted with 100 ml of toluene. The solution was concentrated, and then cooled to −20° C. to obtain the desired compound in the state of orange crystals.

(2) Polymerization

The same procedure as in Example 4 was carried out except that bis[N,N'-bis(trimethylsilyl)benzamidinato]zirconium dichloride was replaced with (cyclopentadienyl)[N,N'-bis(trimethylsilyl)benzamidinato]titanium dichloride and a polymerization time was set to 1 hour.

As a result, 0.1 g of ethylene-(1-octene) copolymer was obtained. The melting point of the thus obtained copolymer was 120° C.

EXAMPLE 11

(1) Catalyst component (A): Preparation of (pentamethylcyclopentadienyl)[N,N'-bis(trimethylsilyl)benzamidinato]titanium dichloride Under a nitrogen atmosphere, 2.89 g (9.98 mmols) of pentamethylcyclopentadienyltitanium dichloride was placed in a 300-ml Schlenk flask sufficiently purged with nitrogen, and 50 ml of toluene dried and purged with nitrogen was added thereto to obtain a suspension, followed by cooling on a dry ice-ethanol bath. Next, under the nitrogen atmosphere, 2.70 g (9.98 mmols) of lithium-N,N'-bis(trimethylsilyl)benzamidinato was placed in another 300-ml Schlenk flask sufficiently purged with nitrogen, and 50 ml of toluene dried and purged with nitrogen was then added thereto to obtain a toluene solution. This solution was added to the previously prepared suspension, followed by stirring at room temperature for 12 hours. Next, the solvent was distilled off under reduced pressure, and the resultant residue was then extracted with 100 ml of toluene. The solution was concentrated, and then cooled to −20° C. to obtain the desired compound in the state of red crystals.

(2) Polymerization

The same procedure as in Example 4 was carried out except that bis[N,N'-bis(trimethylsilyl)benzamidinato] zirconium dichloride was replaced with (pentamethylcyclopentadienyl)[N,N'-bis(trimethylsilyl)benzamidinato]titanium dichloride and a polymerization time was set to 1 hour.

As a result, 6.3 g of ethylene-(1-octene) copolymer was obtained. The intrinsic viscosity [η] of the obtained copolymer was 3.0 dl/g, and the melting point of the copolymer was 120° C.

EXAMPLE 12

(1) Catalyst component (A): Preparation of (cyclopentadienyl)[N,N'-bis(trimethylsilyl)benzamidinato]zirconium dichloride Under a nitrogen atmosphere, 2.57 g (9.78 mmols) of cyclopentadienylzirconium dichloride was placed in a 300-ml Schlenk flask sufficiently purged with nitrogen, and 50 ml of toluene dried and purged with nitrogen was added thereto to obtain a suspension, followed by cooling on a dry ice-ethanol bath. Next, under the nitrogen atmosphere, 2.65 g (9.78 mmols) of lithium-N,N'-bis(trimethylsilyl)benzamidinato was placed in another 300-ml Schlenk flask sufficiently purged with nitrogen, and 50 ml of toluene dried and purged with nitrogen was then added thereto to obtain a toluene solution. This solution was added to the previously prepared suspension, followed by stirring at room temperature for 12 hours. Next, the solvent was distilled off under reduced pressure, and the resultant residue was then extracted with 100 ml of toluene. This solution was concentrated, and then cooled to −20° C. to obtain the desired compound in the state of colorless crystals.

(2) Polymerization

The same procedure as in Example 1 was carried out except that bis[N,N'-bis(trimethylsilyl)benzamidinato]zirconium dichloride was replaced with (cyclopentadienyl)[N,N'-bis(trimethylsilyl)benzamidinato]zirconium dichloride and a polymerization time was set to 20 minutes.

As a result, 14.1 g of polyethylene was obtained. According to measurement in decalin at 135° C., the intrinsic viscosity [η] of the obtained copolymer was 5.1 dl/g, and the melting point of the copolymer was 137° C. With regard to the measured results of molecular weight by GPC, Mw was 308,000 and Mw/Mn was 2.23.

EXAMPLE 13

The same procedure as in Example 4 was carried out except that bis[N,N'-bis(trimethylsilyl)benzamidinato]zirconium dichloride was replaced with (cyclopentadienyl)[N,N'-bis(trimethylsilyl)benzamidinato]zirconium dichloride.

As a result, 20.0 g of ethylene-(1-octene) copolymer was obtained. According to measurement in decalin at 135° C., the intrinsic viscosity [η] of the obtained copolymer was 4.1 dl/g, and the melting point of the copolymer was 123° C. With regard to the measured results of molecular weight by GPC, Mw was 262,000 and Mw/Mn was 2.25. Furthermore, an octene content was measured by $^{13}$C-NMR, and as a result, it was 0.5 mol %.

EXAMPLE 14

Under a nitrogen atmosphere, 400 ml of toluene and 1.2 mmols of triisobutylaluminum (TIBA), 4 micromols of bis[N,N'-bis(trimethylsilyl)benzamidinato]titanium dichloride and 8 micromols of anilinium tetrakis(pentafluorophenyl)borate were placed in a 1-liter autoclave in this order at room temperature, and 75 ml of a toluene solution (0.4 mol as 2-norbornene) containing 70% by weight of 2-norbornene was then added thereto. After this mixed solution was heated to 120° C., reaction was carried out for 30 minutes, while ethylene was continuously introduced into an autoclave so that ethylene partial pressure might be 6 kg/cm$^2$. After the completion of the reaction, the reaction solution was poured into 1 l of methanol to precipitate a polymer. The thus obtained polymer was filtered and then dried to obtain 7.9 g of ethylene-(2-norbornene) copolymer. At this time, polymerization activity was 40 kg/g (Ti).

A norbornene content in the obtained copolymer was measured by $^{13}$C-NMR, and as a result, it was 18 mol %. This value was calculated from a ratio between the sum of a peak value based on ethylene which appeared at about 30 ppm of the $^{13}$C-NMR and a peak value based on methylene groups at the 5-position and the 6-position of the norbornene and a peak value based on a methylene group at the 7-position of the norbornene which appeared at about 32.5 ppm.

Furthermore, the intrinsic viscosity [η] of the copolymer measured in decalin at 135° C. was 1.4 dl/g, and the crystallinity of the copolymer measured by an X-ray diffractiometry was 0.5%.

In addition, the glass transition temperature (Tg) of the copolymer was measured as follows. For a sample piece having a width of 4 mm, a length of 40 mm and a thickness of 0.1 mm, the peak of a loss elastic modulus (E") was measured at a temperature rise rate of 3° C./min and a frequency of 3.5 Hz by the use of Vibron 11-EA model made by Toyo Boalding Co., Ltd. as a measuring device, and the Tg was then calculated from this peak. In consequence, the measured Tg was 7° C.

With regard to the measured results of molecular weight of the obtained copolymer, Mw was 68,000, Mn was 13,800, and Mw/Mn was 4.92.

Furthermore, the Tm of the copolymer was measured at a temperature rise rate of 10° C./min in the range of −50 to 150° C. by DSC of 7 series made by Perkin-Elmer Co., Ltd., but it was not observed.

EXAMPLE 15

Copolymerization was carried out by the same procedure as in Example 14 except that toluene was replaced with hexane. With regard to the resultant copolymer, yield was 3.55 g, polymerization activity was 18 kg/g (Ti), norbornene content was 30 mol %, [η] measured in decalin at 135° C. was 1.64 dl/g, crystallinity was 1.0%, Mw was 78,000, Mn was 14,500, and Mw/Mn was 5.38. Tm was not observed.

EXAMPLE 16

Copolymerization was carried out by the same procedure as in Example 14 except that toluene was replaced with hexane, 40 micromols of bis[N,N'-bis(trimethylsilyl)benzamidinato]titanium dichloride and 80 micromols of dimethylanilinium tetrakis(pentafluorophenyl)borate were used, and a copolymerization temperature was set to 90° C. With regard to the resultant copolymer, yield was 9.56 g, polymerization activity was 4.9 kg/g (Ti), norbornene content was 16 mol %, [η] measured in decalin at 135° C. was 3.59 dl/g, crystallinity was 0.5%, Tg was 3° C., Mw was 126,000, Mn was 50,400, Mw/Mn was 2.5, and Tm was 82° C. (a broad peak).

EXAMPLE 17

Copolymerization with ethylene was carried out by the same procedure as in Example 1 (3) except that after the pouring of toluene, 0.5 ml of 1,5-hexadiene was added. With regard to the resultant copolymer, yield was 2.9 g, and [η] measured in decalin at 135° C. was 6.3 dl/g.

EXAMPLE 18

Under a nitrogen atmosphere, 360 ml of toluene dried and purged with nitrogen and 1.3 ml (10 mmols) of ethylidenenorbornene were placed in a 1-liter autoclave sufficiently purged with nitrogen, and 2.0 ml of a 1.0 mol/l triisobutylaluminum (2.0 mmols) solution in toluene was further added, followed by stirring for 30 minutes. Next, 12 g of propylene was added thereto under the nitrogen atmosphere, and the solution was heated to 80° C. Afterward, 20 ml of toluene dried and purged with nitrogen was introduced under the nitrogen atmosphere into a catalyst introduction tube sufficiently purged with nitrogen and connected to the autoclave, and 0.10 ml of a 0.010 mol/l bis[N,N'-bis(trimethylsilyl)benzamidinato]zirconium dichloride (1.0 micromol) solution in toluene was added thereto. Next, 2.78 ml of a 2.16 mols/l methylaluminoxane (6.0 mmols) solution in toluene was added. This solution was poured into the above-mentioned 1-liter autoclave by ethylene pressure, while stirring was done in the autoclave, and polymerization was carried out in situ for 1 hour, while ethylene was introduced so that the pressure in the autoclave might constantly be maintained at 8 atm.

As a result, 13.2 g of ethylene-propylene-ethylidenenorbornene copolymer was obtained. According to measurement in decalin at 135° C., the [η] of the obtained copolymer was 3.0 dl/g, and the Tm of the copolymer was 123° C. Furthermore, the presence of the ethylidenenorbornene taken in a polymer chain was confirmed by an infrared absorption spectrum.

EXAMPLE 19

Under a nitrogen atmosphere, 150 ml of toluene dried and purged with nitrogen and 150 ml of a styrene monomer dried and purged with nitrogen were placed in a 1-liter autoclave sufficiently purged with nitrogen, and 2.0 ml of a 1.0 mol/l triisobutylaluminum (2.0 mmols) solution in toluene was further added thereto, followed by stirring for 30 minutes. Next, 2.78 ml of a 2.16 mols/l methylaluminoxane (6.0 mmols) solution in toluene was added thereto under the nitrogen atmosphere. This solution was heated to 70° C., and 3.0 ml of a 0.010 mol/l (pentamethylcyclopentadienyl)[N,N'-bis(trimethylsilyl)benzamidinato]titanium dichloride (30 micromols) solution in toluene was then added thereto. Next, while this solution was stirred, ethylene was introduced thereinto, and polymerization was carried out for 2 hours while ethylene was introduced so that 8 atm might constantly be maintained. As a result, 1.2 g of ethylene-styrene copolymer was obtained. The [η] of the copolymer measured in 1,2,4-trichlorobenzene at 135° C. was 0.46 dl/g, and the Tm of the copolymer was 123° C.

EXAMPLE 20

A magnetic stirrer was put in a 100-ml eggplant type flask sufficiently purged with nitrogen, and 30 ml of a styrene monomer dried and purged with nitrogen was then introduced thereinto under a nitrogen atmosphere. Afterward, 0.80 ml of a 1.0 mol/l triisobutylaluminum (0.80 mmol) solution in toluene was further added thereto under the nitrogen atmosphere, followed by stirring for 30 minutes. Next, while the solution was stirred, 0.37 ml of a 2.16 mols/l methylaluminoxane (0.80 mmol) solution in toluene was added thereto under the nitrogen atmosphere, and 0.40 ml of a 0.010 mol/l (pentamethylcyclopentadienyl)[N,N'-bis(trimethylsilyl)benzamidinato]titanium dichloride (4.0 micromols) solution in toluene was further added thereto under the nitrogen atmosphere. Afterward, this flask was immersed in an oil bath at 70° C. to carry out polymerization for 4 hours.

As a result, 21 g of polystyrene was obtained, and the Tm of the polystyrene was 269° C. The [η] of the copolymer could not be measured because of an ultra-high molecular weight.

EXAMPLE 21

Polymerization was carried out by the same procedure as in Example 19 except that (pentamethylcyclopentadienyl)

[N,N'-bis(trimethylsilyl)benzamidinato]titanium dichloride was replaced with bis[N,N'-bis(trimethylsilyl)benzamidinato]zirconium dichloride.

As a result, 2.8 g of polystyrene was obtained. The [η] of this polystyrene measured in 1,2,4-trichlorobenzene at 135° C. was 0.34 dl/g, and the Tm of the polystyrene was 264° C.

EXAMPLE 22

Polymerization was carried out by the same procedure as in Example 19 except that (pentamethylcyclopentadienyl)[N,N'-bis(trimethylsilyl)benzamidinato]titanium dichloride was replaced with (cyclopentadienyl)[N,N'-bis(trimethylsilyl)benzamidinato]titanium dichloride.

As a result, 4.6 g of polystyrene was obtained. The [η] of this polystyrene measured in 1,2,4-trichlorobenzene at 135° C. was 0.16 dl/g, and the Tm of the polystyrene was 267° C.

POSSIBILITY OF INDUSTRIAL UTILIZATION

A polymerization catalyst of the present invention has a high activity at 70 to 200° C. which is efficient in an industrial process or at a higher temperature and permits the formation of a polymer which has a high molecular weight and a uniform composition and which can control a molecular weight distribution.

By the use of this polymerization catalyst, a homopolymer or a copolymer can be efficiently prepared.

What is claimed is:

1. A polymerization catalyst which comprises (A) a transition metal compound represented by the general formula (I)

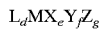

wherein M represents Ti, Zr or Hf, L represents a formula

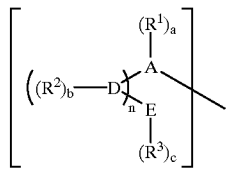

wherein A and E each represent N (nitrogen) or O (oxygen), D represents C (carbon) or Si (silicon), and at least one of A and E represents N (nitrogen), and A-D, D-D and D-E each is linked by a single bond, a double bond or a combination thereof; A is bonded to M, E is coordinated with M in the case that E has a lone pair, or E is bonded by resonance in the case that the resonance occurs among M, A, D and E; n represents an integer of 0 to 10; ((R²)$_b$-D)s may be the same or different; R¹, R² and R³ each represents a hydrogen atom, a halogen atom, an alkoxy group, a hydrocarbon group or a hetero-atom-containing hydrocarbon group, may be the same or different from each one another and may crosslink thereamong, and R¹, R², R³ and M may crosslink thereamong; a, b and c each is an integer of 0 to 2; d is 1 or 2; Ls may be the same or different from each other and may crosslink therebetween; X represents a ligand having conjugated π electrons; e is 0 or 1; and the L group and the X group may crosslink therebetween; Y represents a σ-bond ligand or a chelate ligand; d+e+f=4; and Ys may be the same or different from each other; Z represents a Lewis base; g is an integer of 0 to 4; and Zs may be the same or different from each other; and (B) an activation cocatalyst.

2. The polymerization catalyst according to claim 1 wherein the activation cocatalyst (B) is a compound capable of forming an ionic complex from the transition metal compound of the component (A).

3. The polymerization catalyst according to claim 1 wherein the activation cocatalyst (B) is an aluminoxane.

4. The polymerization catalyst according to claim 3 wherein the aluminoxane of the activation cocatalyst (B) is a chain aluminoxane represented by the general formula (IV)

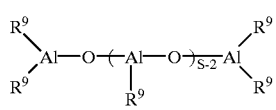

(wherein R⁹s each represents a halogen atom or a hydrocarbon group selected from the group consisting of an alkyl group, an alkenyl group, an aryl group and an aralkyl group having 1 to 20 carbon atoms, the respective R⁹s may be the same or different, and s represents a polymerization degree and is an integer of 3 to 50).

5. The polymerization catalyst according to claim 3 wherein the aluminoxane of the activation cocatalyst (B) is a cyclic aluminoxane represented by the general formula (V)

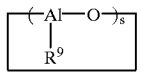

(wherein R⁹s and s are as defined above).

6. The polymerization catalyst according to claim 1 wherein the activation cocatalyst (B) is a Lewis acid.

7. The polymerization catalyst according to claim 1 which additionally comprises an organic aluminum compound (C).

8. The polymerization catalyst according to claim 7 wherein the activation cocatalyst (B) is a compound capable of forming an ionic complex from the transition metal compound of the component (A).

9. The polymerization catalyst according to claim 7 wherein the activation cocatalyst (B) is an aluminoxane.

10. The polymerization catalyst according to claim 9 wherein the aluminoxane of the activation cocatalyst (B) is a chain aluminoxane represented by the general formula (IV).

11. The polymerization catalyst according to claim 9 wherein the aluminoxane of the activation cocatalyst (B) is a cyclic aluminoxane represented by the general formula (V).

12. The polymerization catalyst according to claim 7 wherein the activation cocatalyst (B) is a Lewis acid.

13. A process for preparing a polymer which comprises homoplymerizing an olefin in the presence of a polymerization catalyst described in claim 1.

14. A process for preparing a copolymer which comprises copolymerizing at least one selected from olefins, and other polymerizable unsaturated compounds in the presence of a polymerization catalyst described in claim 1.

15. A process for preparing a polymer which comprises homopolymerizing an olefin in the presence of a polymerization catalyst described in claim 7.

16. A process for preparing a copolymer which comprises copolymerizing at least one selected from olefins, and other polymerizable unsaturated compounds in the presence of a polymerization catalyst described in claim 7.

17. The polymerization catalyst according to claim 1 wherein A and E each is nitrogen; D is carbon; a, b, and c are each 1; and g is 0.

18. The polymerization catalyst according to claim 4 wherein $R^o$s each represents a halogen atom or a hydrocarbon group selected from the group consisting of an alkyl group, an alkenyl group, an aryl group and an arylalkyl group having 1 to 12 carbon atoms and wherein s is an integer of 7 to 40.

19. The polymerization catalyst according to claim 1 wherein f=2.

* * * * *